United States Patent
Chang

(10) Patent No.: US 6,826,043 B2
(45) Date of Patent: Nov. 30, 2004

(54) CONNECTING MECHANISM

(75) Inventor: Chung Liang Chang, Taipei (TW)

(73) Assignee: First International Computer Inc., Taipei (TW)

( * ) Notice: Subject to any disclaimer, the term of this patent is extended or adjusted under 35 U.S.C. 154(b) by 0 days.

(21) Appl. No.: 10/372,768

(22) Filed: Feb. 26, 2003

(65) Prior Publication Data

US 2004/0165342 A1 Aug. 26, 2004

(51) Int. Cl.$^7$ ................................................ H05K 5/00
(52) U.S. Cl. ........................ 361/683; 361/725; 345/168; 248/913
(58) Field of Search ................................. 361/679–687, 361/724–727; 345/179, 165, 156, 168, 173; 16/286; 312/223.2; 248/913

(56) References Cited

U.S. PATENT DOCUMENTS 6,460,221 B1 * 10/2002 Eromaki ...................... 16/286
6,504,706 B2 * 1/2003 Stewart ...................... 361/681
6,700,773 B1 * 3/2004 Adriaansen et al. ........ 361/680

* cited by examiner

Primary Examiner—Hung Van Duong
(74) Attorney, Agent, or Firm—Rosenberg, Klein & Lee

(57) ABSTRACT

The connecting mechanism of the invention is pivotally mounted between the display device and the computer host. The connecting mechanism has an articulated arm having a first rod and a second rod connected to each other via a hinge. The ends of the first rod are respectively pivotally connected to a sidewall of the computer host and the hinge. The second rod is longer than at least half a width of the display device. A third end of the second rod is pivotally mounted on a sidewall of the display device in an appropriate location, such as a central part of the sidewall. A fourth end of the second rod is pivotally connected to the hinge. The above arrangement allows inclination and horizontal/vertical adjustments of the display device relative to the computer host.

6 Claims, 8 Drawing Sheets

CONNECTING MECHANISM

BACKGROUND OF THE INVENTION

1. Field of the Invention

The invention relates to a connecting mechanism mounted between a display device and a computer host.

2. Description of the Related Art

As shown in FIG. 1, a conventional laptop 6 includes a screen display 62 and a host 61 pivotally connected to each other by a hinge 63, which allows folding/unfolding of the screen display 62. FIG. 1 illustrates the screen display 62 in an unfolded position away from the host 61. FIG. 2 illustrates the screen display 62 in a folded position over the host 61.

In the above structure of the conventional laptop 6, the hinge 63 pivotally connecting the screen display 62 and the host 61 is mounted in a fixed position on the laptop 6. Therefore, only folding/unfolding operations (i.e. only inclination adjustment) of the screen display 62 are allowed, while horizontal/vertical moves of the display device 61 over the host 61 (i.e. horizontal/vertical adjustment) are inconveniently not possible.

SUMMARY OF INVENTION

It is therefore one object of the invention to provide a connecting mechanism that, mounted between a display device and a computer host, allows inclination and horizontal/vertical adjustments of the display device relative to the computer host.

It is another object of the invention to provide a connecting mechanism that, mounted between the display device and the computer host, has a simple structure and is easy to manipulate.

To accomplish the above and other objectives, the connecting mechanism is pivotally mounted to a side of a display device and a corresponding side of a computer host. The connecting mechanism includes an articulated arm having a first rod and a second rod connected via a hinge. First and second ends of the first rod respectively pivotally connect to a sidewall of the computer host and the hinge. The second rod is longer than at least half a width of the display device. A third end of the second rod is pivotally mounted on a sidewall of the display device in an appropriate location such as a central part of the sidewall. A fourth end of the second rod is pivotally connected to the hinge. The above arrangement thereby allows inclination and horizontal/vertical adjustments of the display device.

According to another embodiment of the connecting mechanism, the first rod is pivotally connected to the host, and the second rod is pivotally mounted on the sidewall of the display device in an appropriate location such as a central part of the sidewall. The above arrangement allows a further movement of the display device closer to the user.

To provide a further understanding of the invention, the following detailed description illustrates embodiments and examples of the invention, this detailed description being provided only for illustration of the invention.

BRIEF DESCRIPTION OF THE DRAWINGS

The drawings included herein provide a further understanding of the invention. A brief introduction of the drawings is as follows.

DETAILED DESCRIPTION OF THE EMBODIMENTS

Figure 1:
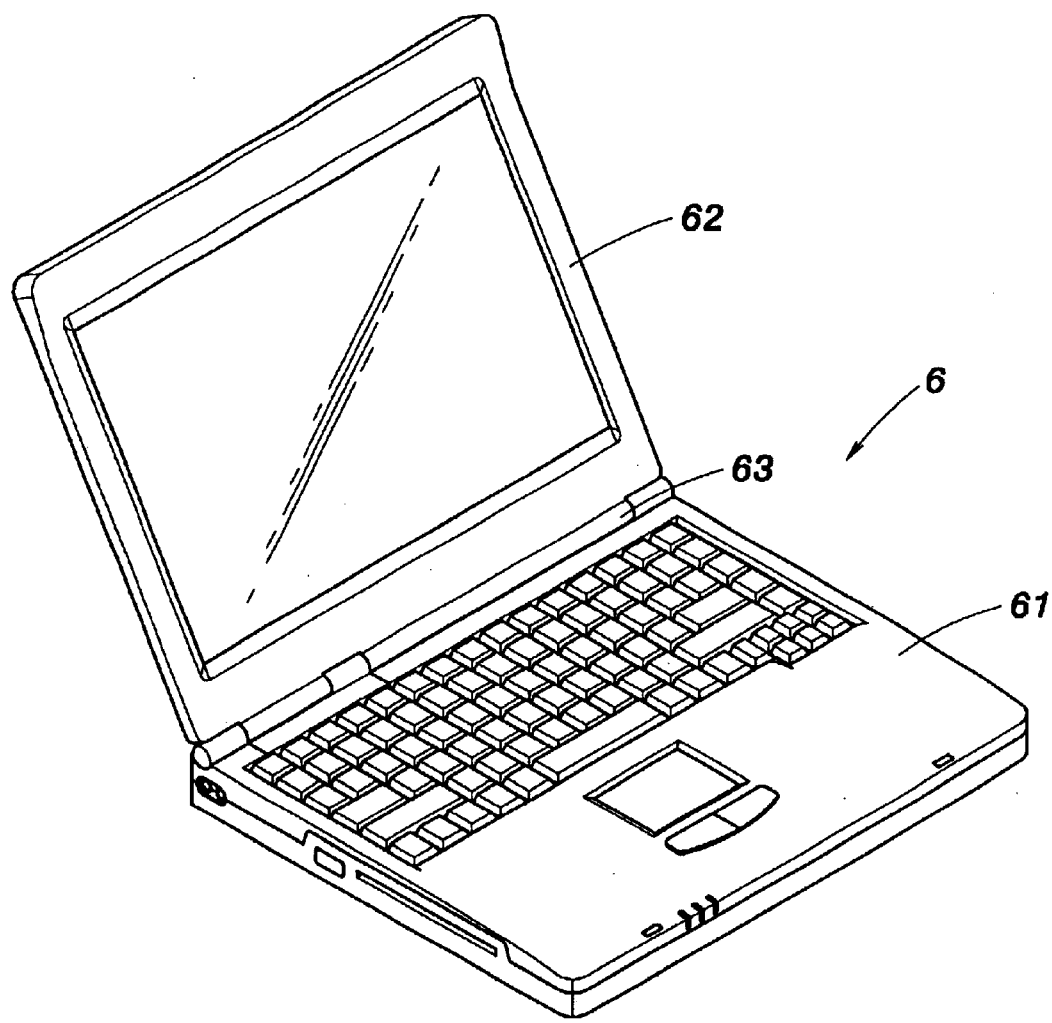
FIG. 1 is a perspective view of a conventional laptop computer.

Wherever possible in the following description, like reference numerals will refer to like elements and parts unless otherwise illustrated.

Figure 2:
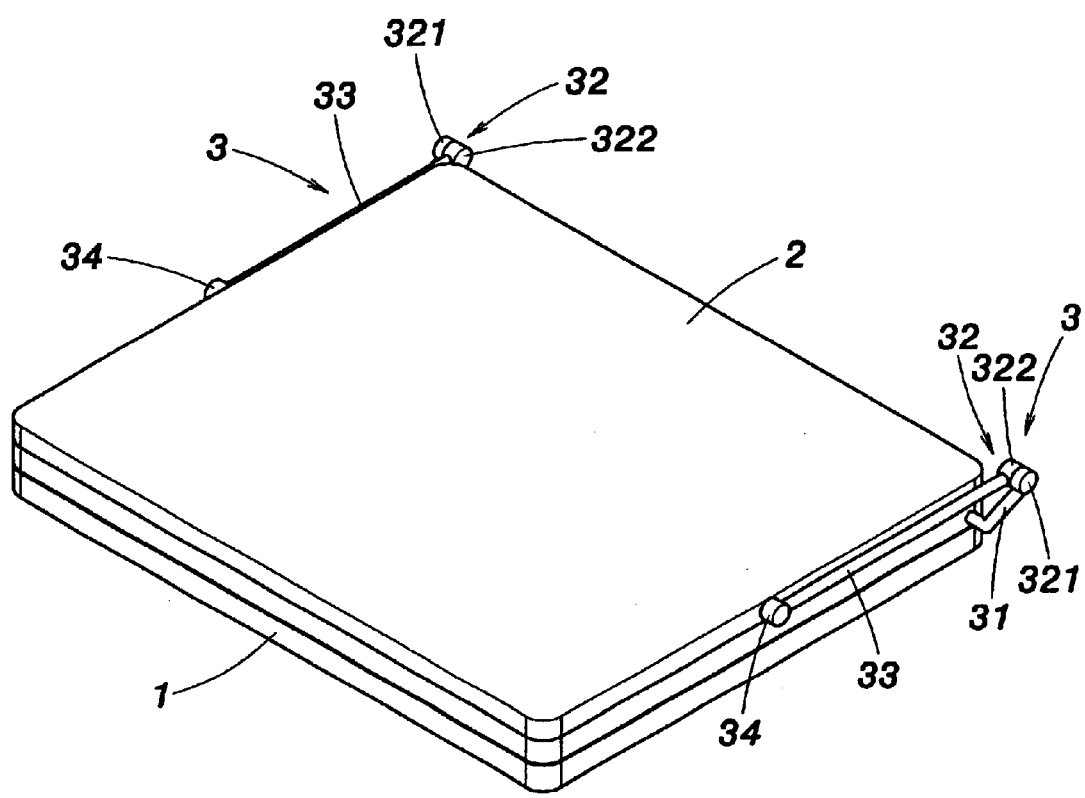
FIG. 2 is a perspective view of a connecting mechanism mounted on a laptop computer in a folded position according to one embodiment of the invention.
Figure 3:
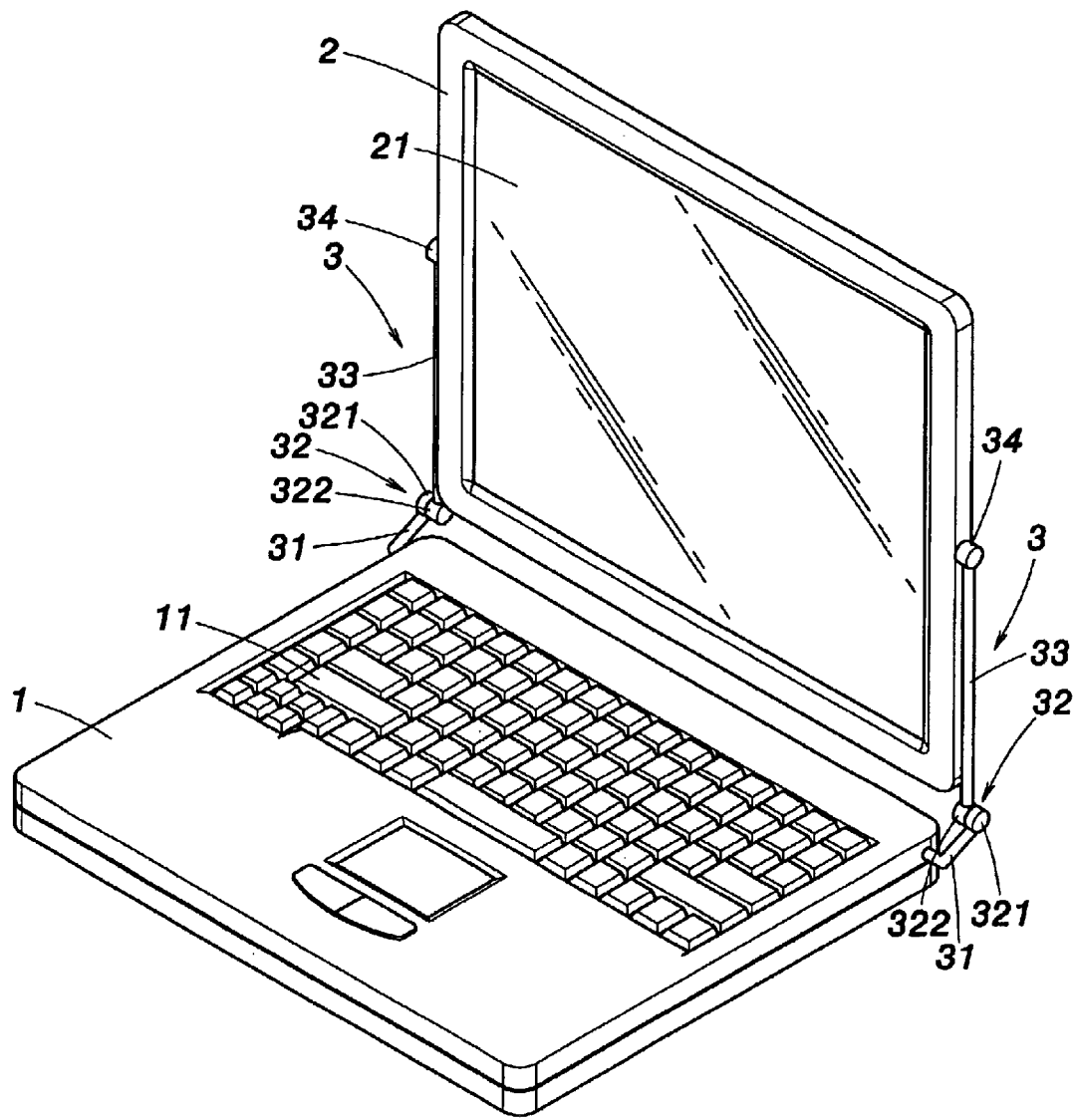
FIG. 3 is a perspective view of a connecting mechanism mounted on a laptop computer in an unfolded position according to one embodiment of the invention.

Referring to FIG. 2 and FIG. 3, a connecting mechanism 3 of the invention is pivotally mounted between a display device 2 and a computer host 1. In this embodiment of the invention, the computer host is, for example, a laptop computer, and the display device 2 is, for example, a liquid crystal display (LCD).

The connecting mechanism 3 includes an articulated arm having a first rod 31 and a second rod 33 connected via a hinge 32. First and second ends of the first rod 31 respectively pivotally connect to a sidewall of the computer host 1 and a first sleeve 321 of the hinge 32. The second rod 33 is longer than at least half a width of the display device 2. A third end of the second rod 33 is pivotally mounted on a sidewall of the display device 2 in an appropriate location such as a central part of the sidewall via a third sleeve 34. A fourth end of the second rod 33 is pivotally connected to a second sleeve 322 of the hinge 32.

When the display device 2 is folded on the computer host 1, the second rod 33 is positioned parallel to the display device 2, as shown in FIG. 2. When the display device 2 is unfolded from the computer host 1, the second rod 33 rotates via the second sleeve 322 of the hinge 32 to approximately vertically position the display device 2 on the rear side of the computer host 1, as shown in FIG. 3.

Figure 4:
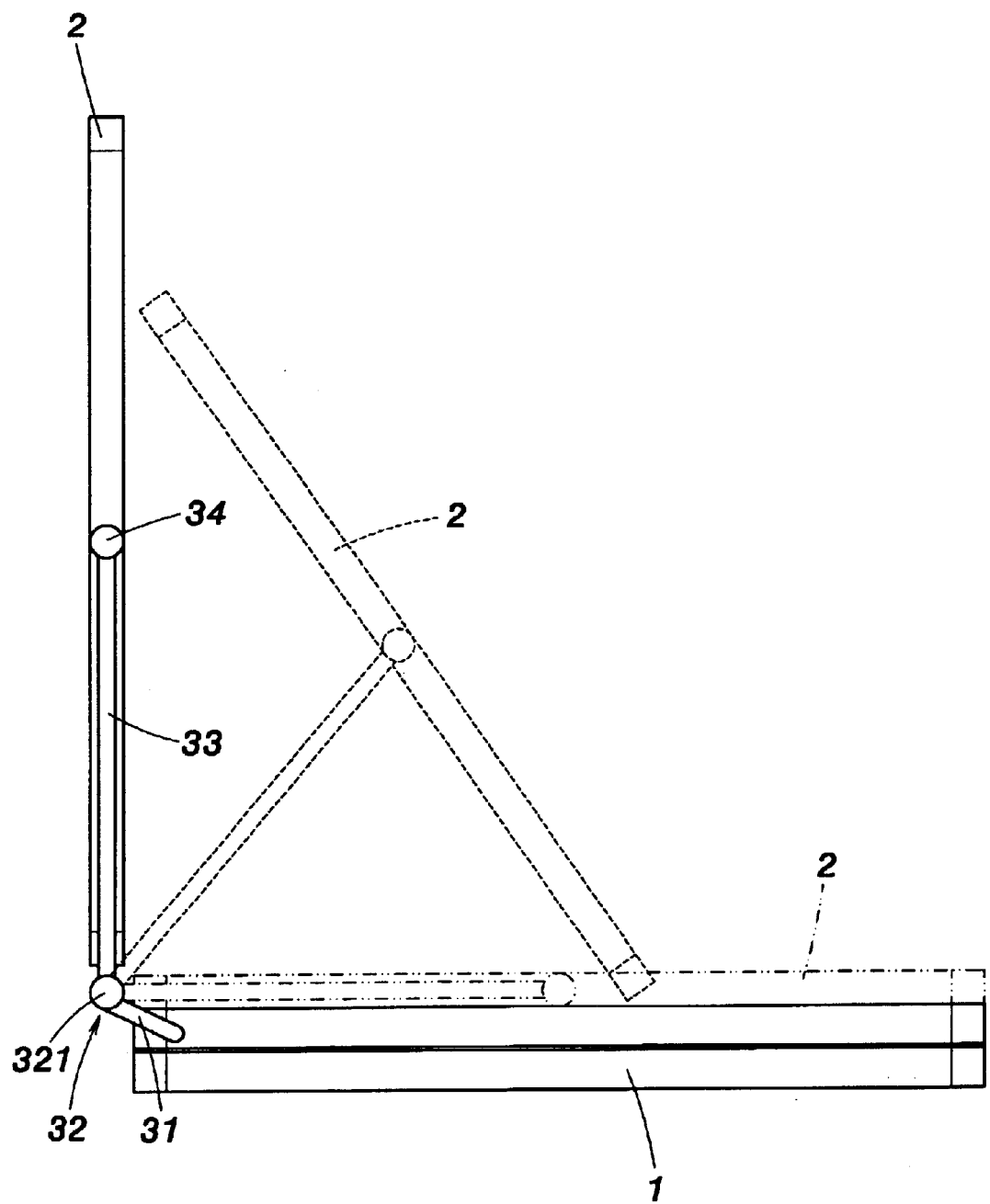
FIG. 4 is a side view illustrating a connecting mechanism mounted on a laptop computer, being in a first positioning configuration according to one embodiment of the invention.
Figure 5:
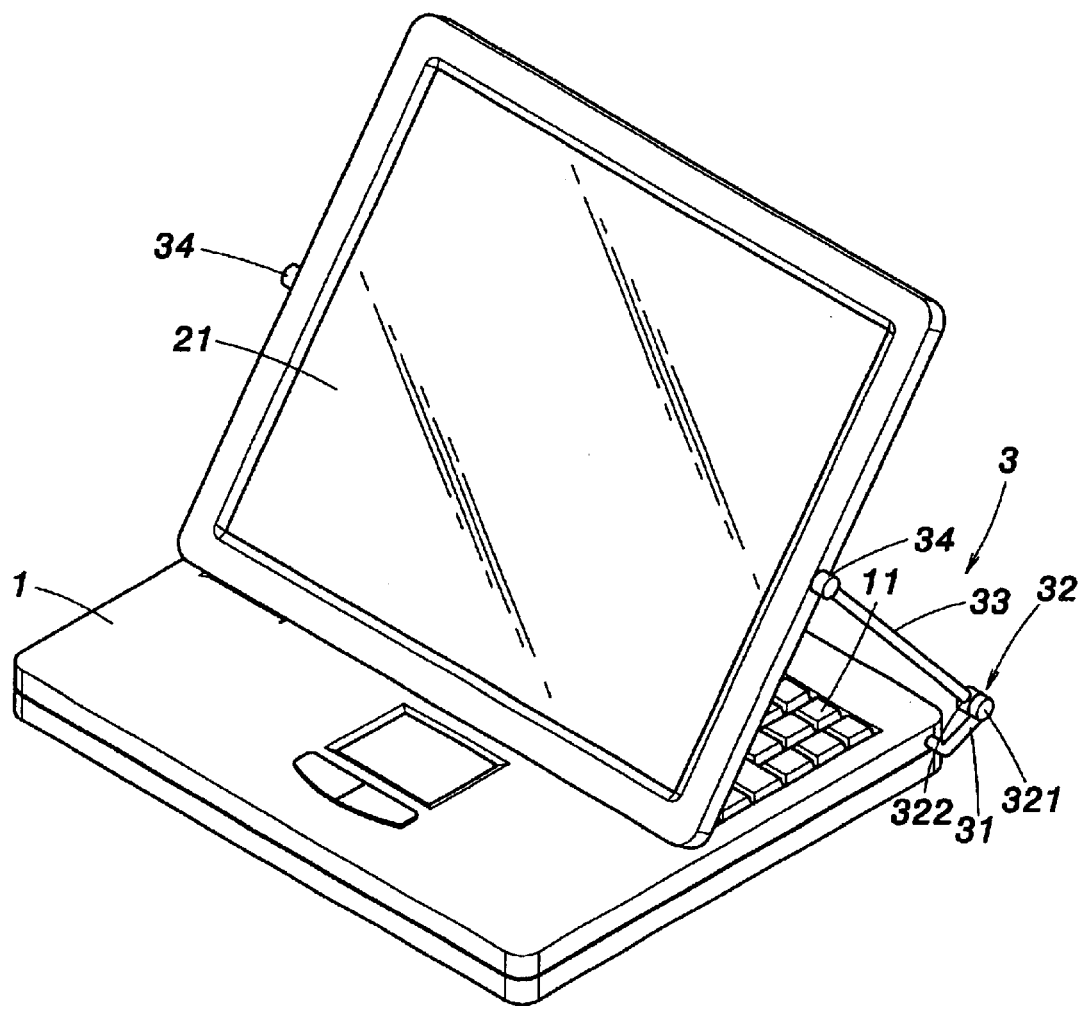
FIG. 5 is a perspective view illustrating a connecting mechanism mounted on a laptop computer, being in a second positioning configuration according to one embodiment of the invention.

Referring to FIG. 4 and FIG. 5, if the display device is to be inclined and/or its location relative to the computer host 1 is to be changed, the second rod 33 is rotated toward a front side of the computer host 1 with an acute angle between the first and second rods 31, 33. Thereafter, the display device 2 is inclined to face up as desired, as shown in FIG. 5.

Figure 6:
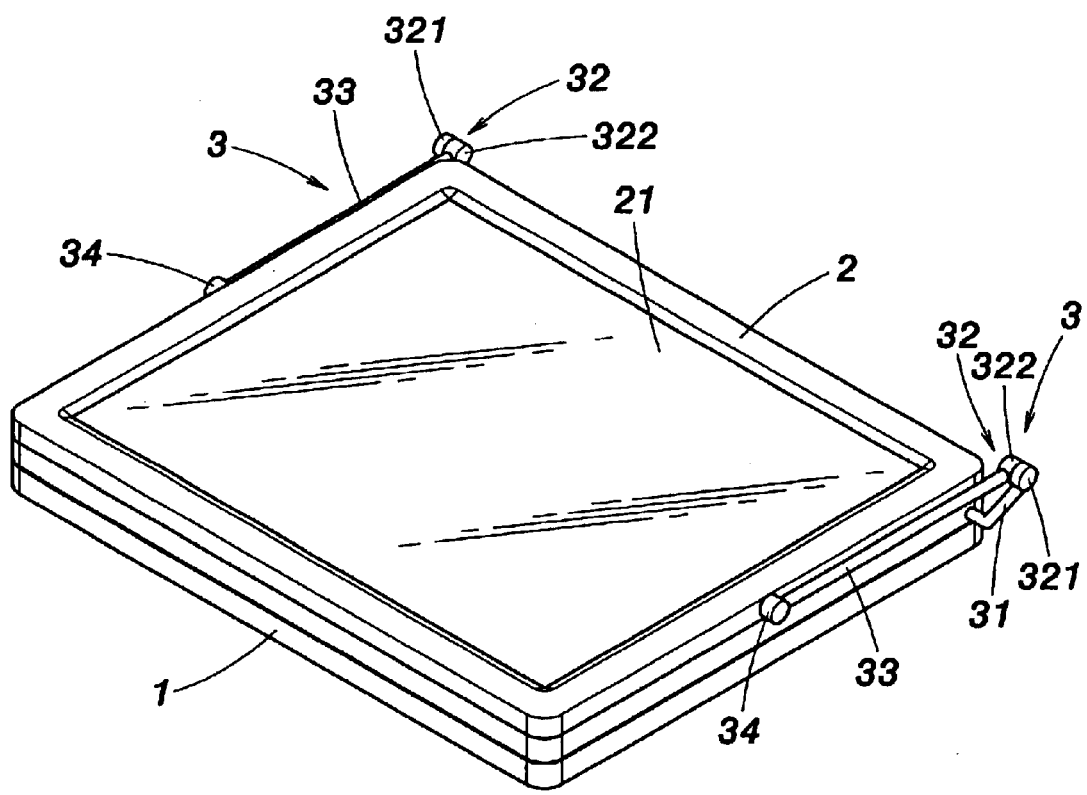
FIG. 6 is a perspective view illustrating a connecting mechanism mounted on a laptop computer, being in a third positioning configuration according to one embodiment of the invention.

Referring to FIG. 4 and FIG. 6, if the display device 2 has to lie face-up above the computer host 1, the display device 2 is unfolded from the computer host 1, and rotated relative to the third sleeve 34 until the screen panel 21 of the display device 2 faces up. Then, the second rod 33 moves toward the computer host 1 to have the display device 2 lie on the computer host 1, as shown in FIG. 6. Thereby, inclination adjustments and horizontal/vertical position changes of the display device 2 can be accomplished.

Figure 7:
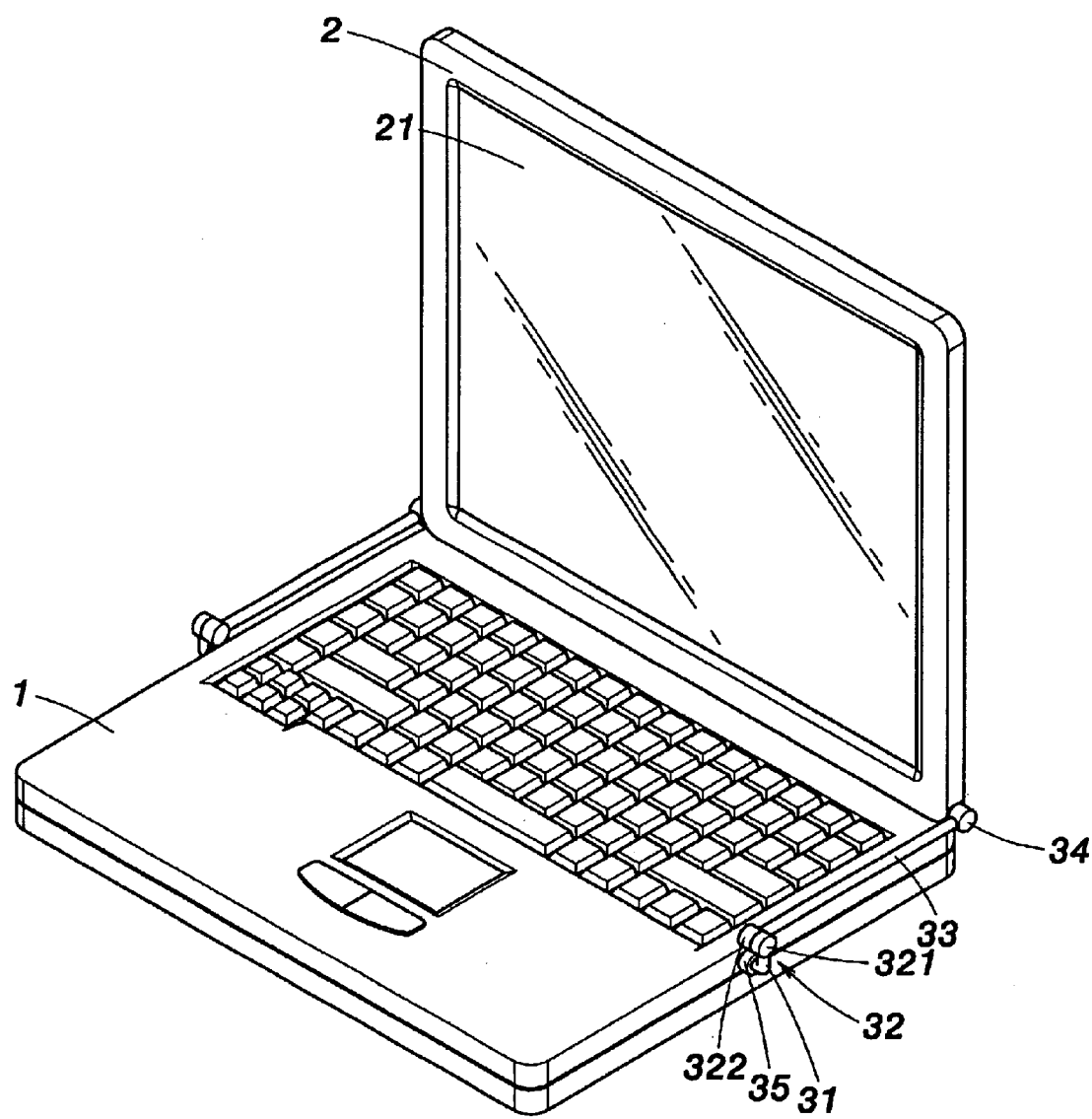
FIG. 7 is a perspective view of a connecting mechanism mounted on a laptop computer according to another embodiment of the invention.
Figure 8:
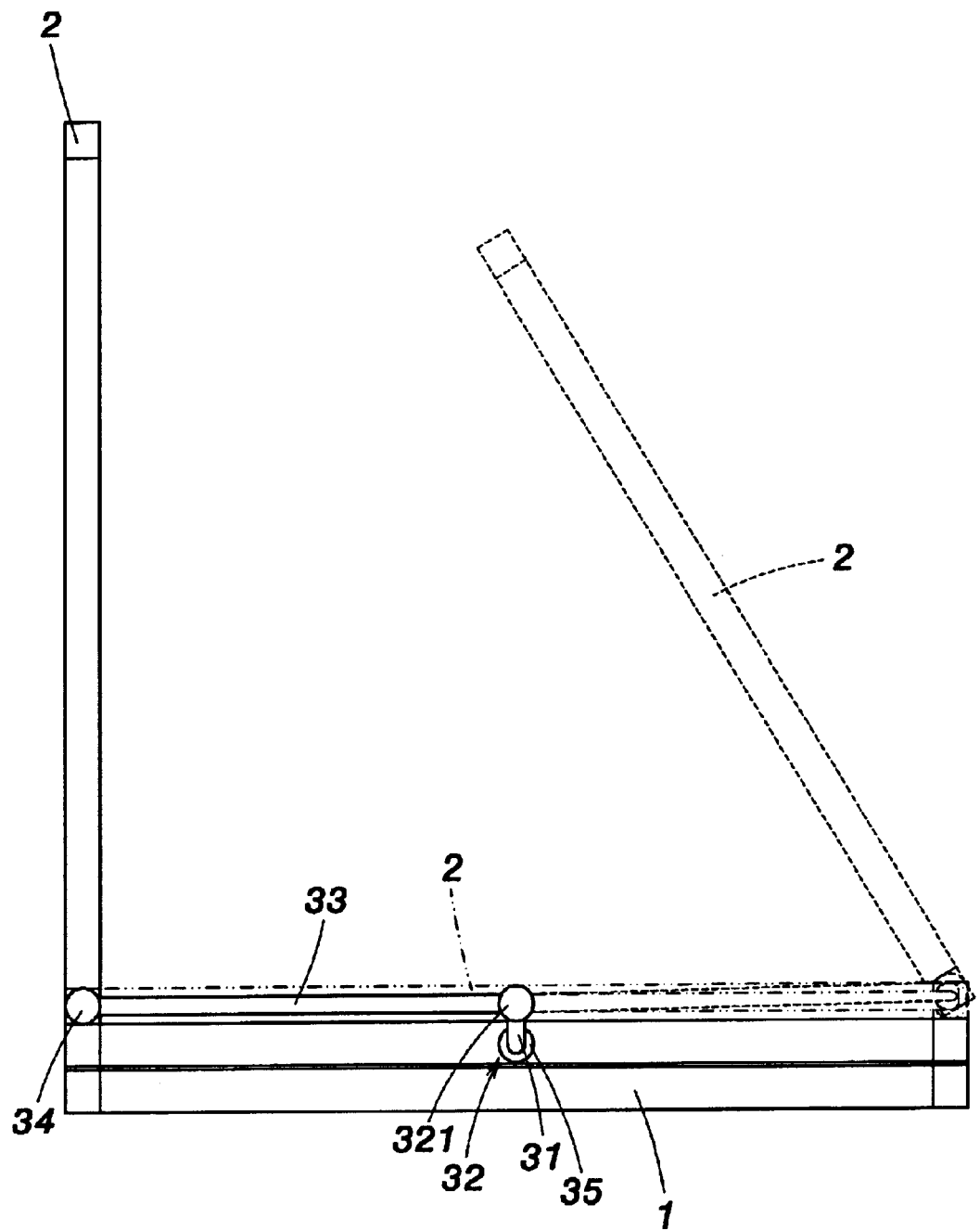
FIG. 8 is a perspective view illustrating a connecting mechanism mounted on a laptop computer, being in a first positioning configuration according to the other embodiment of the invention.

Referring to FIG. 7, according to another embodiment, a first end of the first rod 31 is pivotally connected to the computer host 1 via a fourth sleeve 35 in an appropriate location, such as central location at a side of the computer host 1. A second end of the first rod 31 is pivotally connected to the first sleeve 321 of the hinge 32. A third end of the second rod 33 is pivotally connected to a side of the display device 2. A fourth end of the second rod 33 is pivotally connected to the second sleeve 322 of the hinge 32. By changing the relative position of the first rod 31 and the second rod 33 and rotating the first and second rods 31, 33 relative to the sleeves 322, 34, the display device 2 is appropriately positioned near a front side of the computer host 1, as shown in FIG. 8.

As described above, the connecting mechanism 3 of the invention therefore allows inclination and horizontal/vertical adjustments of the display device relative to the computer host 1, which makes it more convenient to use.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A connecting mechanism connecting a side of a display device to a corresponding side of a host computer for folding/unfolding the display device relative to the host computer, the connecting mechanism comprising:

a first rod having a first end pivotally connected to a portion of the side of the host computer adjacent a rear end thereof and a second end connected to a first sleeve of a hinge; and a second rod having a third end pivotally connected to a central portion of the side of the display device and a fourth end connected to a second sleeve of the hinge, the second sleeve being pivotally displaceable relative to the first sleeve, the second rod having a length longer than a length of the first rod, wherein the display device is capable of rotating relative to the second rod and moving with respect to the host computer.

2. The connecting mechanism of claim 1, wherein the host computer is a laptop computer.

3. The connecting mechanism of claim 1, wherein the display device is a liquid crystal display (LCD).

4. The connecting mechanism of claim 1, wherein the third end of the second rod is coupled to a third sleeve pivotally connected to the side of the display device.

5. The connecting mechanism of claim 1 or 4, wherein the second rod is longer than at least half a width of the display device.

6. A connecting mechanism connecting a side of a display device to a corresponding side of a host computer for folding/unfolding the display device relative to the host computer, the connecting mechanism comprising:

a first rod having a first end pivotally connected to a central portion of the side of the host computer and a second end connected to a first sleeve of a hinge; and a second rod having a third end pivotally connected to a portion of the side of the display device adjacent an end thereof and a fourth end connected to a second sleeve of the hinge, the second sleeve being pivotally displaceable relative to the first sleeve, the second rod having a length longer than a length of the first rod, the first end of the first rod being coupled to a third sleeve and the third sleeve being pivotally coupled to the side of the host computer, wherein the display device is capable of rotating relative to the second rod and moving with respect to the host computer.

* * * * *